United States Patent
Cavill et al.

(10) Patent No.: US 11,933,693 B1
(45) Date of Patent: Mar. 19, 2024

(54) DROP TEST APPARATUS

(71) Applicant: WING Aviation LLC, Mountain View, CA (US)

(72) Inventors: Loewen Cavill, San Francisco, CA (US); Xingshu Sun, Cupertino, CA (US)

(73) Assignee: WING AVIATION LLC, Mountain View, CA (US)

( * ) Notice: Subject to any disclaimer, the term of this patent is extended or adjusted under 35 U.S.C. 154(b) by 0 days.

(21) Appl. No.: 17/707,091

(22) Filed: Mar. 29, 2022

(51) Int. Cl.
*G01M 7/08* (2006.01)
*B64F 5/60* (2017.01)

(52) U.S. Cl.
CPC .............. *G01M 7/08* (2013.01); *B64F 5/60* (2017.01)

(58) Field of Classification Search
CPC .................................... G01M 7/08; B64F 5/60
See application file for complete search history.

(56) References Cited

U.S. PATENT DOCUMENTS

| | | | | |
|---|---|---|---|---|
| 4,304,348 A | * | 12/1981 | Kato | B65H 20/04 226/166 |
| 4,346,766 A | * | 8/1982 | Manten | E21B 7/025 173/28 |

FOREIGN PATENT DOCUMENTS

| | | | | |
|---|---|---|---|---|
| CN | 208847444 U | * | 5/2019 | |
| CN | 110887632 B | * | 9/2021 | B64F 5/60 |
| CN | 110887632 B | | 9/2021 | |
| CN | 111707436 B | * | 5/2022 | G01M 7/08 |
| JP | 2862103 B2 | * | 2/1999 | |
| JP | 4434475 B2 | * | 3/2010 | |
| RU | 18058 U1 | * | 5/2001 | |

OTHER PUBLICATIONS

Machine tranlsation of JP2862103B2 (Year: 1999).*
AD-500, ACCUDROPtm 500 LB. Drop Tester, L.A.B. Equipment, Inc., <www.labequipment.com> [retrieved on Mar. 7, 2022], 2 pages.
Drop Tower DT-205 Series Drop Tester for Mobile Products, Shinyei Testing Machinery Co., Ltd., <https://www.shinyei-tm.com/product_DT_DT205.html> [retrieved on Mar. 7, 2022], 4 pages.
Package Drop Test, Manufactured in India by: Test Techno Consultants, <www.PackTest.com> [retrieved on Mar. 7, 2022], 1 page.

(Continued)

*Primary Examiner* — Alexander Satanovsky
*Assistant Examiner* — Sangkyung Lee
(74) *Attorney, Agent, or Firm* — CHRISTENSEN O'CONNOR JOHNSON KINDNESS PLLC (57) ABSTRACT

A drop test system includes support members offset from each other and having corresponding tracks, a lifting rod bridging the support members and having rod ends adapted to engage with the tracks to move along the tracks, and a pair of spiral cams adapted to rotate in unison and positioned to engage with and reciprocally lift and drop the lifting rod as the spiral cams rotate. The spiral cams each have a perimeter shape that includes an abrupt section and a curved section that connects to opposing ends of the abrupt section with a smooth curvature. The lifting rod is adapted to ride on the perimeter shape of the spiral cams and gradually lift and drop a unit under test (UUT) as the spiral cams rotate.

23 Claims, 9 Drawing Sheets

(56) References Cited

OTHER PUBLICATIONS

Package Drop Testing Machine, Envisys reimagining the environment, <www.envisystech.com> [retrieved on Mar. 7, 2022], 2 pages.
Types of Shock Testing Machines, Understanding Vibration Testing, VRU, <https://vru.vibrationresearch.com/lesson/types-shock-testing-machines/> [retrieved on Mar. 7, 2022], 7 pages.

* cited by examiner

DROP TEST APPARATUS

TECHNICAL FIELD

This disclosure relates generally to testing apparatus, and in particular but not exclusively, relates to drop testing for unmanned aerial vehicles.

BACKGROUND INFORMATION

Unmanned aerial vehicles (also known as drones) experience a variety of mechanical forces and environmental exposures during deployment. These mechanical forces include g-forces observed in flight and mechanical shocks experienced when landing. The environmental exposures include weather (rain, moisture, etc.) and contaminants (dust, dirt, salt, etc.) Repeated exposure to cyclical g-forces, vibrations, mechanical shocks, and environmental exposures can negatively impact efficient operation, compromise structural/functional integrity, and otherwise detrimentally impact overall sound operation of an aging UAV fleet.

Accordingly, it is important to rigorously test UAVs, and their subcomponents, to characterize how UAVs age, uncover lifecycle failure points, and enforce quality control over manufacturing processes. Testing can help ensure deployment of only mechanically sound UAVs and inform best practices for maintenance and retirement schedules.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Embodiments of an apparatus, system and method of operation for a drop test system are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments disclosed herein describe a drop test system/assembly that can evaluate potential damage to a design of a unit under test (UUT) when exposed to reoccurring mechanical shocks. For example, the drop test system is well-suited to evaluate the design of an unmanned aerial vehicle (UAV), or sub-components thereof, onto a hard surface (e.g., a concrete slab). Peripheral components may be added to the drop test system to test repeated landings in windy conditions and/or during exposure to various simulated environmental elements (e.g., water, saltwater, dirt/dust, or other environmental contaminants). The UUT may be powered or unpowered during the testing. The drop test assembly can replicate thousands of landings in just a couple hours. Various landing speeds can be evaluated by a simple swapping out of a pair of spiral cams that drop the UUT from different selectable heights to simulate soft vs hard landings.

In addition to mechanical shock testing, embodiments of the drop test assembly can also replicate repeated g-forces observed in flight. This can be used to compare not only airframe designs but also payload package designs and their robustness with rough flights and varying weather exposures. Additionally, the drop test assembly can test landing pad designs/materials and how they wear out or fail over time. The designs of the landing pads, which also operate as charging pads, may be evaluated to see how effective a particular design/material choice is at achieving an effective electrical contact with the UAV for charging after a series of landings. The drop test assembly is designed with cost effective materials/components, flexible to test a large variety of designs and operating conditions while also being lightweight and compactable for storage or shipping.

Figure 1A:
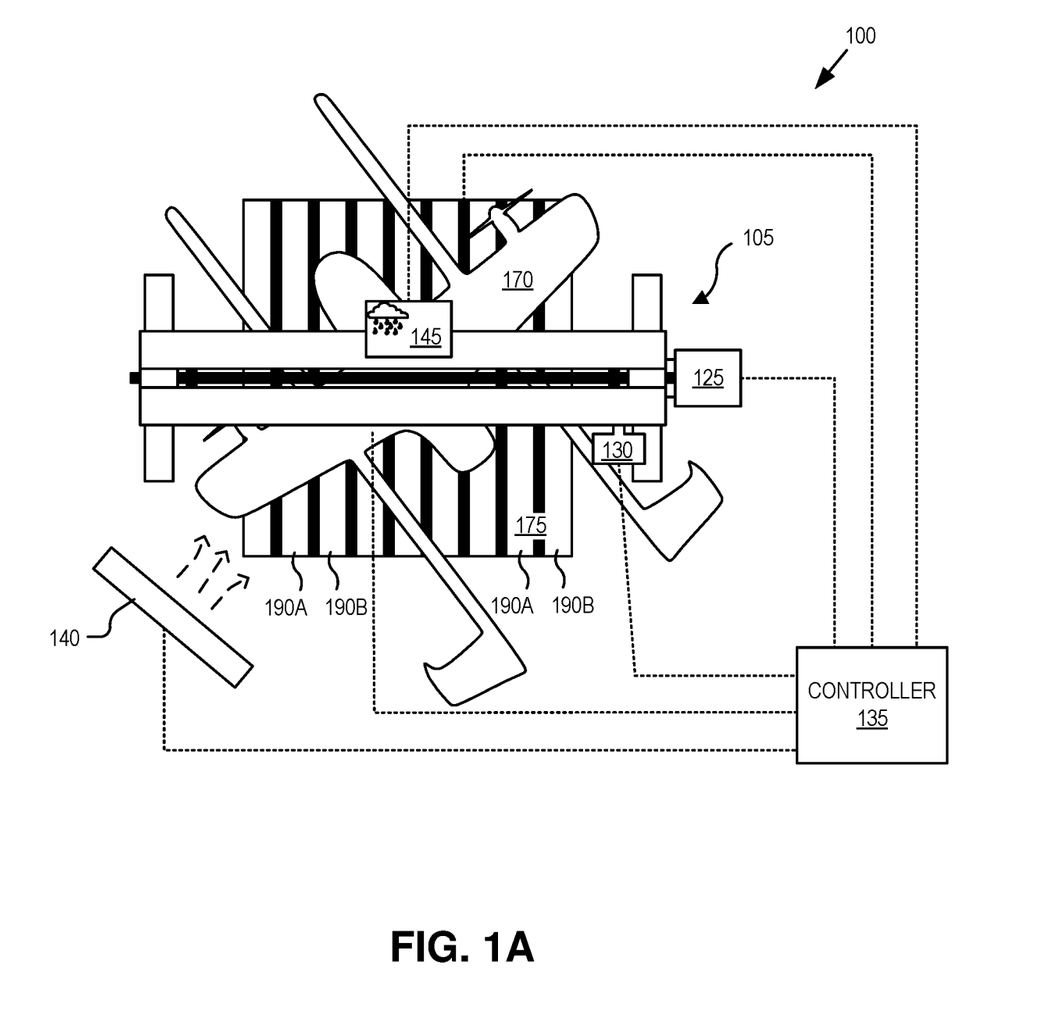
FIG. 1A is a functional block diagram illustrating a drop test system with an unmanned aerial vehicle (UAV) tethered as the unit under test (UUT), in accordance with an embodiment of the disclosure.
Figure 1B:
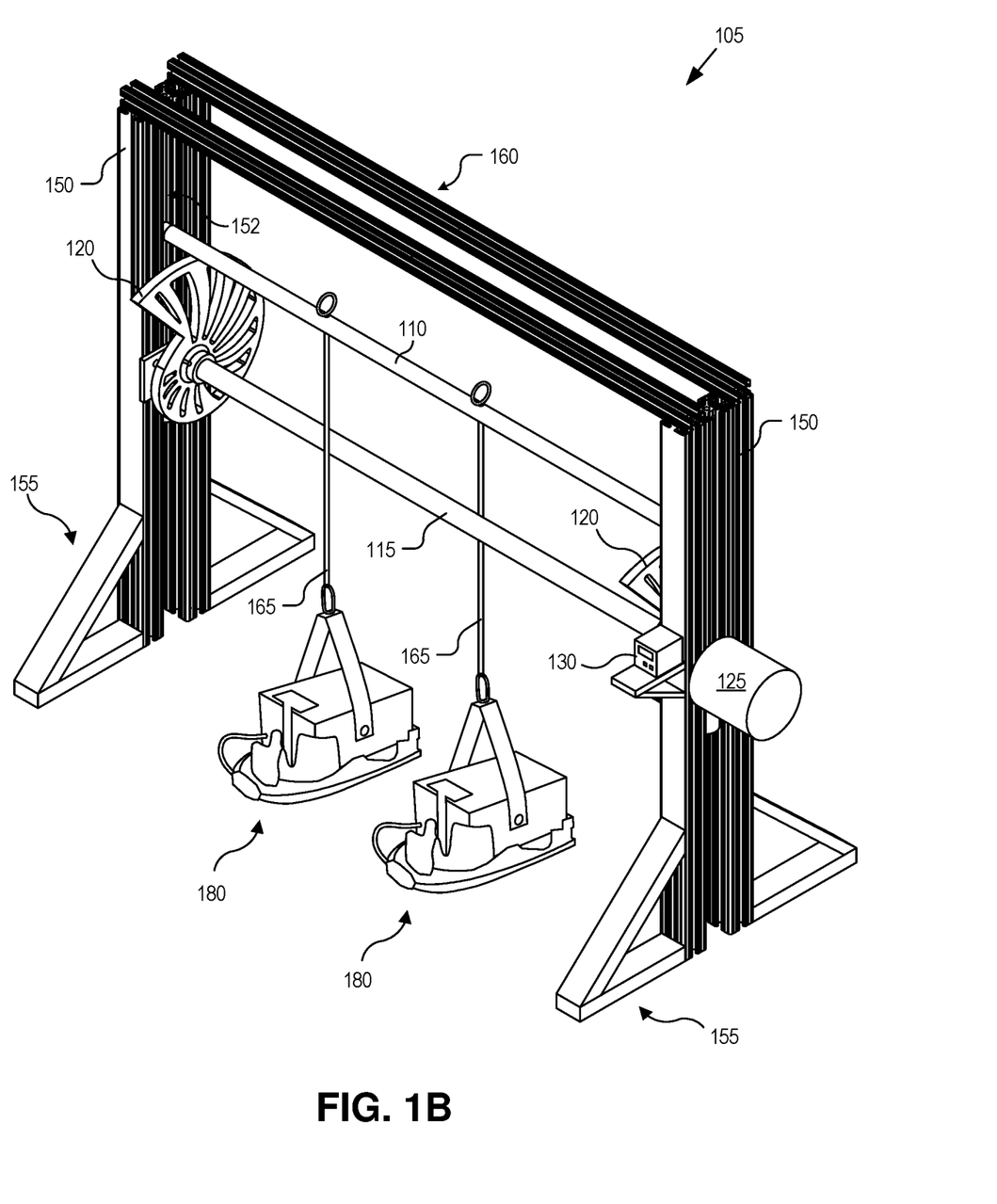
FIG. 1B is a perspective view illustration of a frame assembly of the drop test system with multiple sub-components tethered as the UUT, in accordance with an embodiment of the disclosure.

FIGS. 1A and 1B illustrate a drop test system/assembly 100 for mechanical shock testing of a UUT (e.g., UAV or subcomponents thereof), in accordance with an embodiment of the disclosure. FIG. 1A is a plan view functional block diagram of drop test assembly 100 while FIG. 1B is a perspective view illustration of the same. The illustrated embodiment of drop test assembly 100 includes a frame assembly 105, a lifting rod 110, a camshaft 115, a pair of spiral cams 120, a motor 125, a drop counter 130, a controller 135, a fan 140, and a moisture dispenser 145. The illustrated embodiment of the frame assembly 105 includes support members 150, feet 155, and a cross member 160. The illustrated embodiment of support members 150 include tracks 152 that engage with sliding carriages disposed on the rod ends of lifting rod 110.

Figure 8:
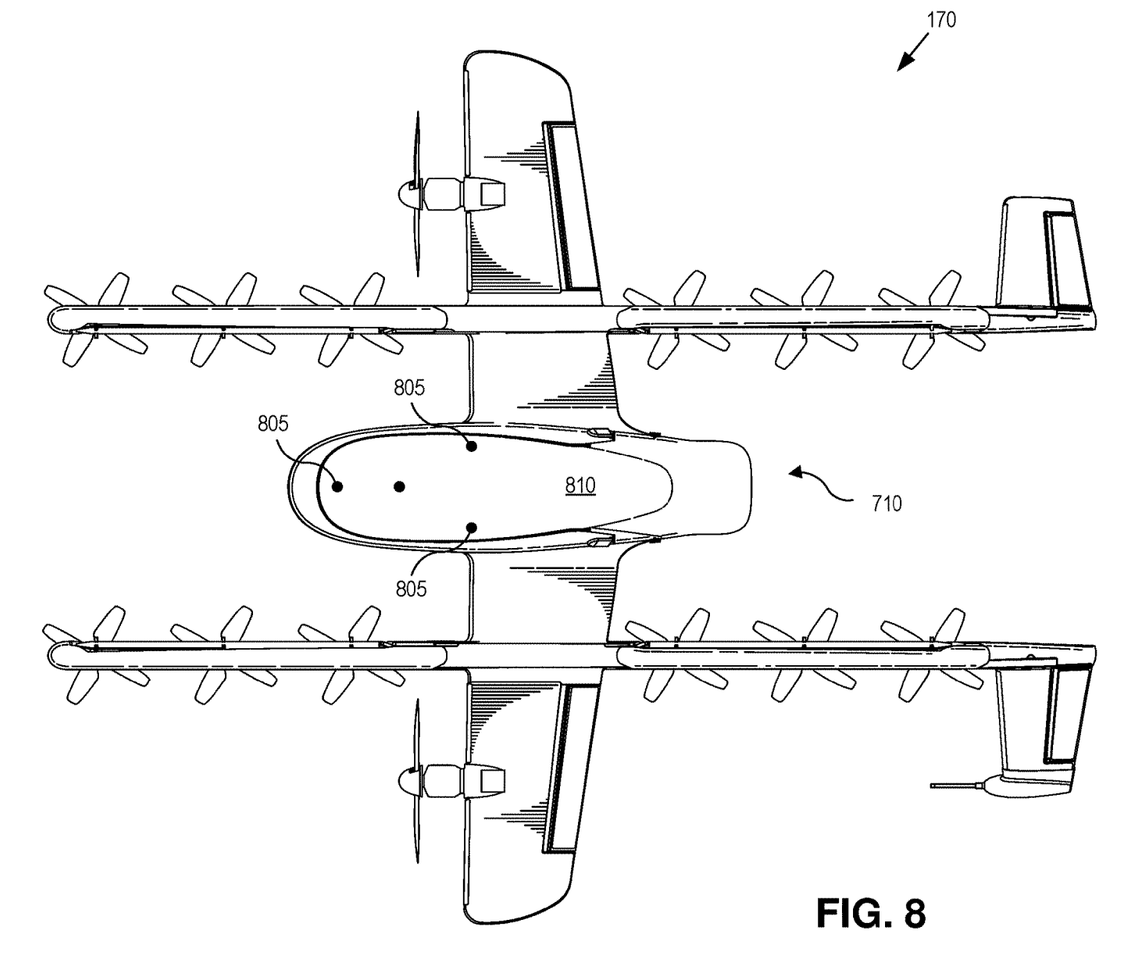
FIG. 8 illustrates the bottom side of a UAV including a plurality of charging pins that may be shock/fatigue tested with a sequence of drop tests, in accordance with an embodiment of the disclosure.

Drop test assembly 100 may be operated to mechanical shock test one or more UUTs suspended from lifting rod 110 via harnesses 165. The UUTs may be a UAV 170 positioned over a landing/charging pad 175 (see FIG. 1A) to simulate repeated landings or one or more sub-components 180 of a UAV (see FIG. 1B) to simulate operational stresses and cyclical g-forces/vibrations/shocks experienced during UAV operation. While drop test assembly 100 is described in relation to shock testing UAVs and/or their subcomponents, it is anticipated that drop test assembly 100 may be used to drop test a variety of different devices, products, or components that need not be related to aircraft in general or UAVs specifically. Furthermore, the drop tests may be performed for design validation, fatigue testing, maintenance/service schedule investigations/analysis, lifecycle testing, operational validations, or otherwise. For example, UAV 170 may include charging pins 805 (see FIG. 8) disposed on the underside 810 of its fuselage for charging an onboard battery. Charging pins 805 are adapted to form electrical contact with charging electrodes 190A (ground) and 190B (power) upon landing on pad 175. Drop test assembly 100 may be used to perform a sequence of drop tests on UAV 170 using controller 135 to track and record how often electrical contact is established upon each drop. This testing may be a form of design validation on charging pins 805 and/or pad 175.

During operation, motor 125 (e.g., electric motor) turns camshaft 115 thereby rotating spiral cams 120. The illustrated embodiment of camshaft 115 extends between support members 150. Spiral cams 120 are angularly aligned on camshaft 115 to lift and drop rod ends of lifting rod 110 in unison. In the illustrated embodiment, lifting rod 110 is constrained to move linearly (e.g., up and down) along tracks 152 disposed within support members 150. In one embodiment, support members 150 are vertical support members and tracks 152 are sliding tracks including a groove along which rod ends of lifting shift 110 slide. In various embodiments, lifting rod 110 rests on spiral cams 120. As spiral cams 120 rotate, lifting rod 110 rides along the perimeter shape of spiral cams 120 rising and dropping with each complete revolution of camshaft 115 driven by motor 125 under the influence of controller 135. With each revolution, the UUT is gradually raised and then abruptly dropped. The number of sequential drops over a given period is recorded by drop counter 130. Drop counter 130 engages with one or more of spiral cams 120, camshaft 115, or motor 125 to count revolutions (i.e., drop tests). Drop counter 130 may be implemented as a mechanical counter, an electronic counter, a mechanical switch, an optical switch, a magnetic switch, or otherwise to count revolutions of camshaft 115 and/or spiral cams 120.

The illustrated embodiment of frame assembly 105 is a gantry style frame including vertical support members 150 bridged by cross member 160 and stabilized by feet 155. However, it is appreciated that frame assembly 105 may assume a variety of different shapes, orientations, and configurations not limited to a gantry form factor. For example, frame assembly 105 may assume a cantilever form factor with only a single vertical support. Frame assembly 105 may be fabricated from a variety of materials including extruded aluminum, injection molded plastic, other metals, composites, or otherwise. Similarly, lifting rod 110 and camshaft 115 may be fabricated from a variety of materials and various cross-sectional shapes. For example, camshaft 115 may be an aluminum cylindrical shaft while lifting rod 110 may be a lightweight carbon fiber rod. Although lifting rod 110 and camshaft 115 are illustrated as cylindrical members having circular cross-sectional shapes, other cross-section shapes may be implemented (e.g., rectangular, square, I-beam, etc.)

The illustrated embodiment of drop test assembly 100 includes controller 135 to orchestrate and/or monitor operation of one or more of the other functional components. Controller 135 may be as simple as an on/off switch to turn on/off motor 125 or include a microcontroller with logic (e.g., software, firmware, and/or hardware logic) for executing testing routines and monitoring/recording results from each drop test in a sequence of drop tests. Controller 135 may couple to motor 125 to start/stop motor 125 and even adjust its revolutions per minute (rpms). Controller 135 may couple to counter 130 to reset the count and/or record the count. Controller 135 may couple to fan 140 to enable a crosswind simulation and/or adjust the speed of fan 140. Controller 135 may couple to moisture dispenser 145 to enable/disable moisture dispenser 145 and/or adjust its release rate. Controller 135 may couple to one or both of the UUT (e.g., UAV 170 in FIG. 1A) and/or landing pad 175 to monitor operation of onboard systems throughout the sequence of drop tests. Such monitoring may include recording operational characteristics that may become intermittent due to repeated mechanical shock as a sequence of drop tests proceed. Of course, it should be appreciated that drop test assembly 100 may also be operated without using a centralized controller to orchestrate operations of the other components, but rather, the other components may be enabled, disabled, or reset by a human operator.

Figure 2:
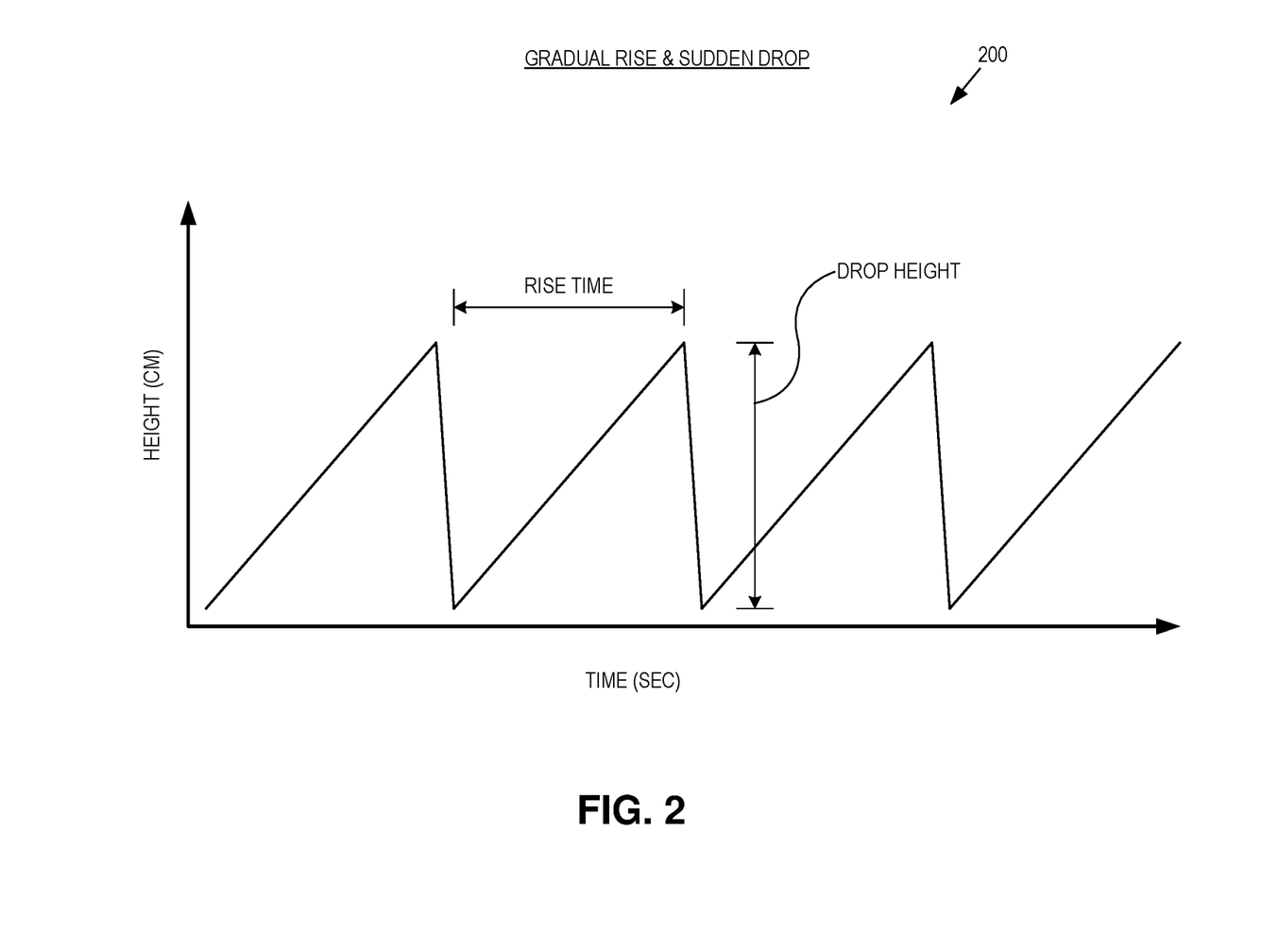
FIG. 2 is a line chart illustrating how the drop test system gradually raises and abruptly drops a UUT, in accordance with an embodiment of the disclosure.
Figure 3:
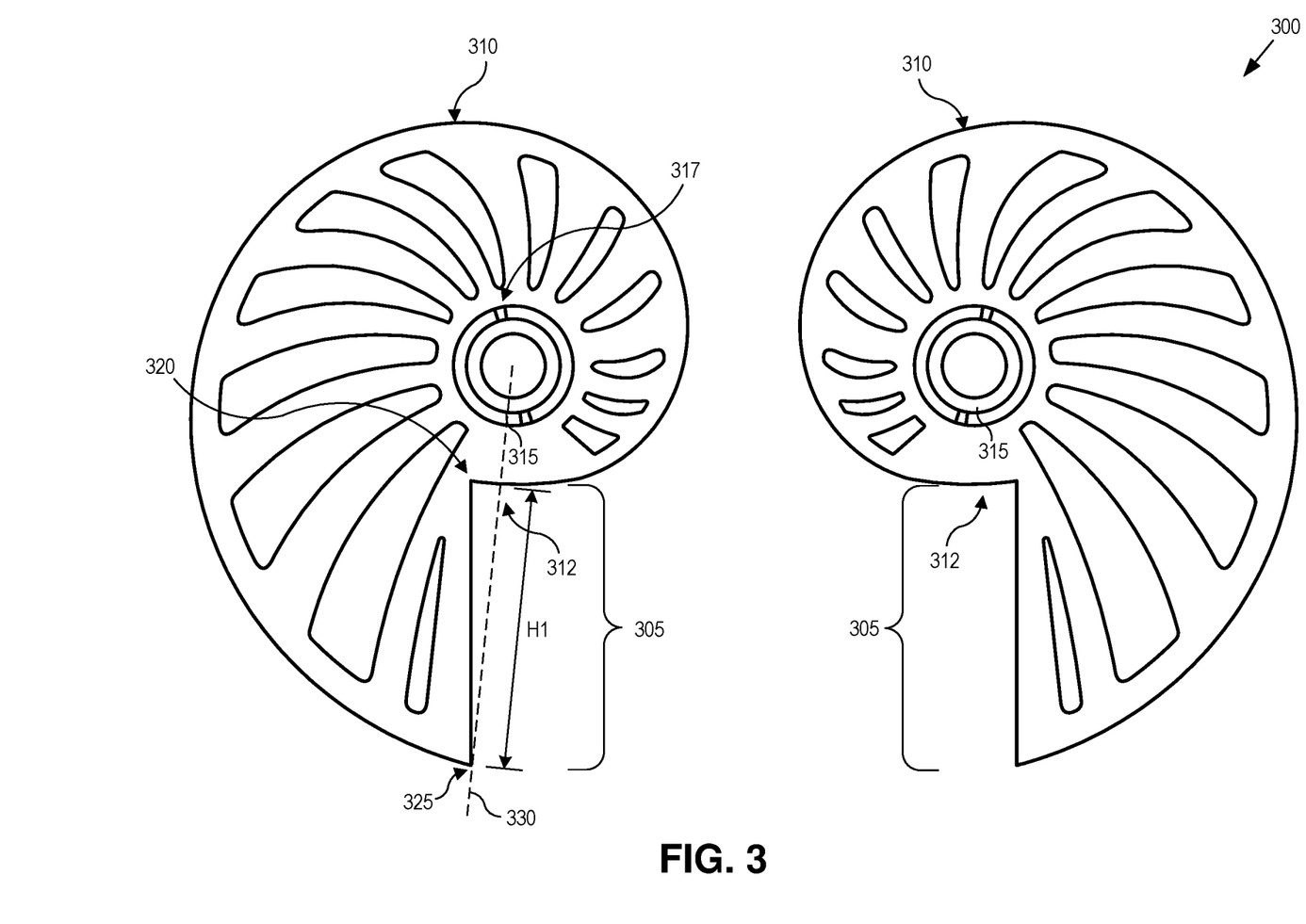
FIG. 3 is a plan view illustration of a pair of spiral cams having a perimeter shape that reciprocally lifts and drops a UUT, in accordance with an embodiment of the disclosure.
Figure 4:
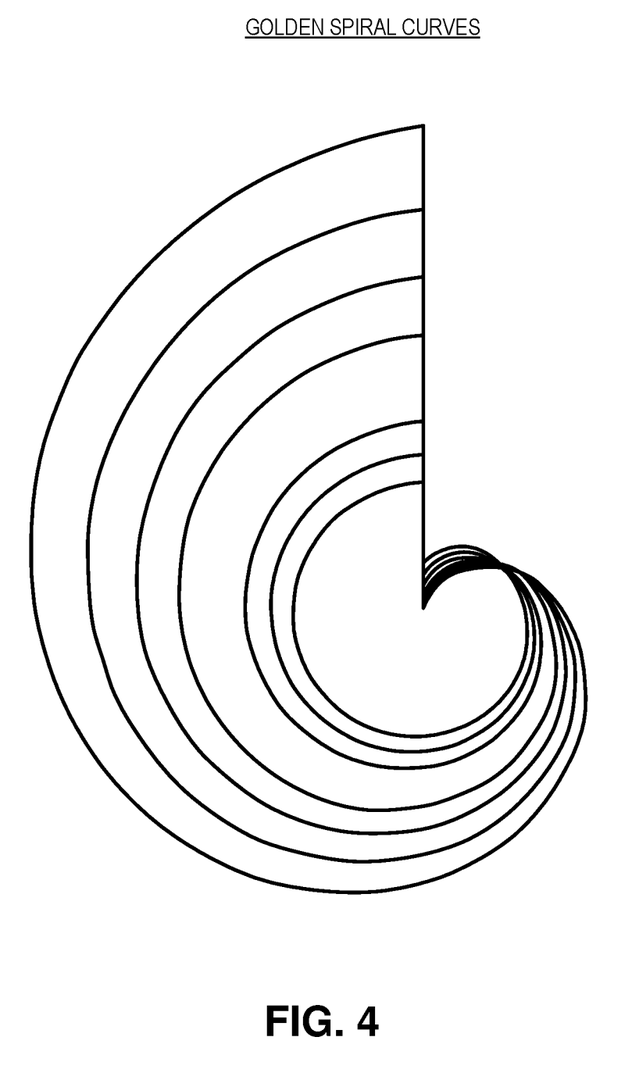
FIG. 4 illustrates how the curved section of the perimeter shape of the spiral cam can assume anyone of a plurality of golden spiral curves, in accordance with an embodiment of the disclosure.

FIG. 2 is a line chart 200 illustrating how drop test assembly 100 gradually raises and then abruptly drops a UUT, in accordance with an embodiment of the disclosure. The rise time is controlled by the rpm of motor while the drop height and linearity of the rising rate are dictated by the perimeter shape of spiral cams 120. FIG. 3 is a plan view illustration of a pair of spiral cams 300 having a perimeter shape that reciprocally lifts and drops a UUT. Spiral cams 300 are one possible implementation of spiral cams 120. Spiral cams 300 rotate in angular alignment with each other on camshaft 115 to reciprocally lift and drop lifting shaft 110 in unison. Lifting rod 110 rides along the perimeter shape of spiral cams 300, which each include an abrupt section 305 and a curved section 310. Curved section 310 connects to opposing ends of abrupt section 305 and includes an initial flat portion 312 (or near flat) that smoothly blends into a spiraling curvature. The illustrated embodiment of curved section 310 has a curvature that gradually and smoothly raises lifting rod 110 while abrupt section 305 suddenly or abruptly drops lifting rod 110 onto flat portion 312 as the rod ends of lifting rod 110 ride along the perimeter shape of spiral cams 300. Thus, curved section 310 (which includes flat portion 312) is a smooth continuous surface that is discontinuously connected at either end by abrupt section 305. In one embodiment, the majority of curved section 310 may assume a golden spiral curvature having a logarithmic spiral growth factor, as illustrated by the various curves in FIG. 4. Of course, other curvatures that gradually raise lifting rod 110 may be used.

Spiral cams 300 further include protruding hubs 315 adapted to slide onto camshaft 115 and enable reconfigurable swapping of spiral cams 300 with different spiral cams. In the illustrated embodiment, protruding hugs 315 include alignment notches 317 that mate with a pin inserted through cam shaft 115 for angular alignment and rotational linkage to cam shaft 115. Swapping spiral cams 300 enables drop test assembly 100 to be quickly reconfigured to perform drop tests from different heights. Specifically, the drop height is dictated by the radial height H1 between the inner end 320 and outer end 325 of abrupt section 305 as measured along radial line 330, which extends from the center of protruding hub 315 to outer end 325. In the illustrated embodiment, outer end 325 of abrupt section 305 cantilevers over inner end 320 to facilitate a freefall gravity drop of lifting shaft 110 when abrupt section 305 rotationally sweeps past lifting shaft 110 (see FIG. 5B). In other words, in the illustrated embodiment, the profile of abrupt section 305 does not extend radially along line 330. In other embodiments, the drop rate can be controlled by recessing outer end 325 back from inner end 320 so that lifting rod 110 rides/slides down a steep slope or ramp as abrupt section 305 sweeps past lifting rod 110. In this latter embodiment, the slope angle along with the rpm of spiral cam 120 would control the drop rate rather than the drop height H1.

Figure 5A:
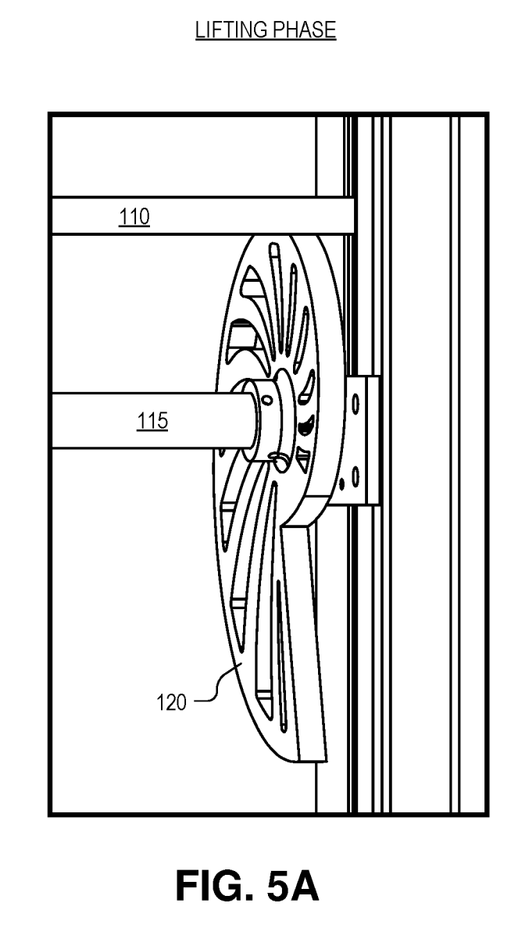
FIG. 5A illustrates a spiral cam during a lifting phase when the curved section of the perimeter shape engages the lifting rod, in accordance with an embodiment of the disclosure.
Figure 5B:
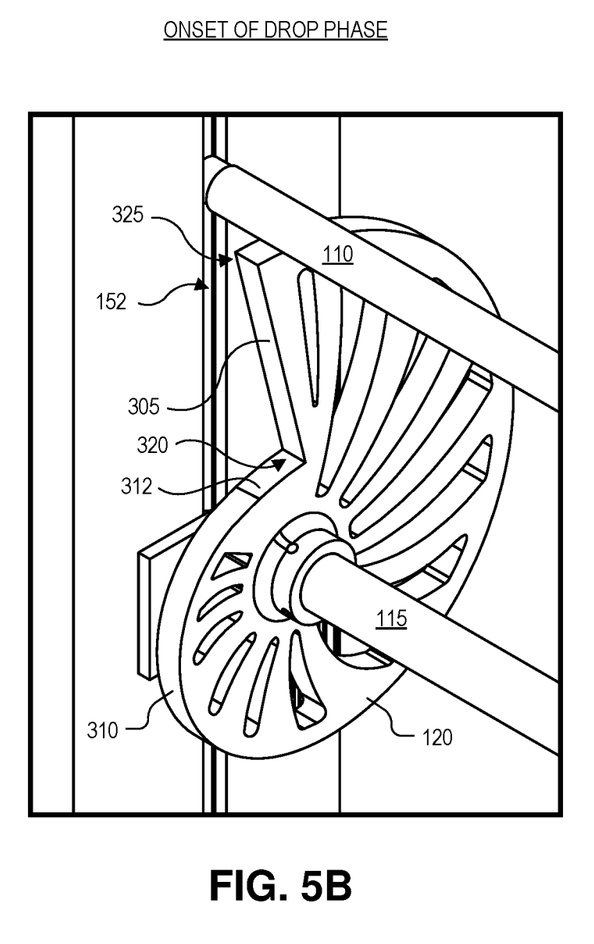
FIG. 5B illustrates the spiral cam about to enter a drop phase when the abrupt section of the perimeter shape drops the lifting rod, in accordance with an embodiment of the disclosure.

FIGS. 5A and 5B illustrate the interaction between spiral cams 120 and lifting rod 110. FIG. 5A illustrates spiral cam 120 (or 300) during a lifting phase when curved section 310 of the perimeter shape engages lifting rod 110. FIG. 5B illustrates spiral cam 120 about to enter a drop phase when abrupt section 305 of the perimeter shape drops lifting rod 110 onto the initial flat portion 312 of curved section 310. FIG. 5B illustrates an embodiment where outer end 325 cantilevers out over inner end 320 upon the onset of the drop phase such that lifting rod 110 executes a freefall gravity drop down to curved section 310. Lifting rod 110 slides along track 152 down to curved section 310. The velocity (vel) of lifting rod 110 (and thus the tether UUT) at the moment of impact is:

$$vel = \sqrt{(2gH)},$$

where g represents the acceleration due gravity (e.g., 9.81 m/s$^2$) and H represents the drop height of the UUT, which is H1 or less depending upon the length of harness 165.

Figure 6:
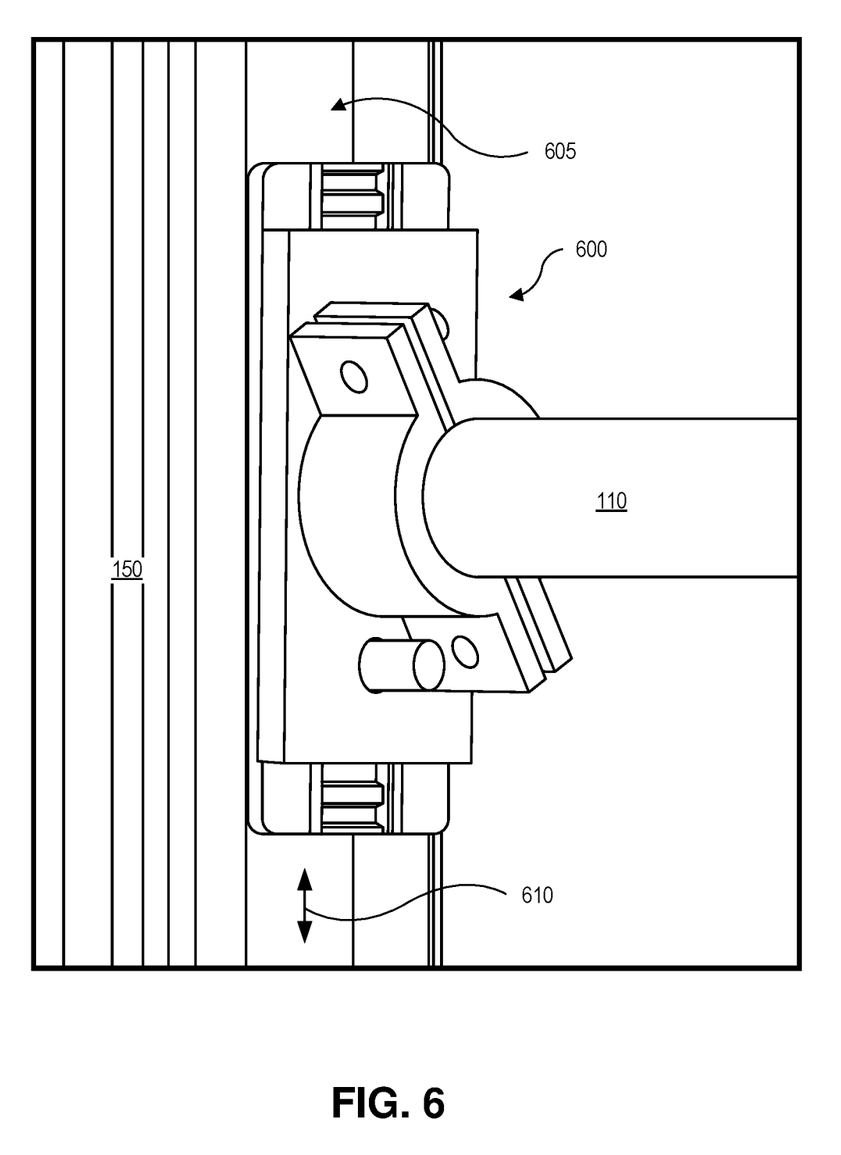
FIG. 6 is a blowup illustration of a sliding carriage that slides along a sliding track in a vertical support member of the frame assembly, in accordance with an embodiment of the disclosure.

FIG. 6 is a blowup illustration of a sliding carriage 600 that slides along a sliding track 605 in support member 150 of frame assembly 105, in accordance with an embodiment of the disclosure. Sliding track 605 is one possible implementation of track 152 while sliding carriage 600 represents a possible implementation of a rod end of sliding rod 110. Sliding carriage 600 slides along sliding track 605 and operates to provide a low friction interface between support member 150 and lifting rod 110. In one embodiment, sliding carriage 600 includes a plastic liner that mates with the metal sliding track 605 to reduce friction. The illustrated embodiment of sliding carriage 600 is elongated along a dimension 610 parallel to sliding track 605. This elongation serves to provide torsional rigidity along dimension 610 and the reduce the likelihood of lifting rod 110 binding in sliding track 605. Finally, sliding carriage 600 also serves as a fastener to sliding rod 110 that permits disassembly and removal of sliding rod 110 from sliding track 605 for compact storage or transportation.

Figure 7:
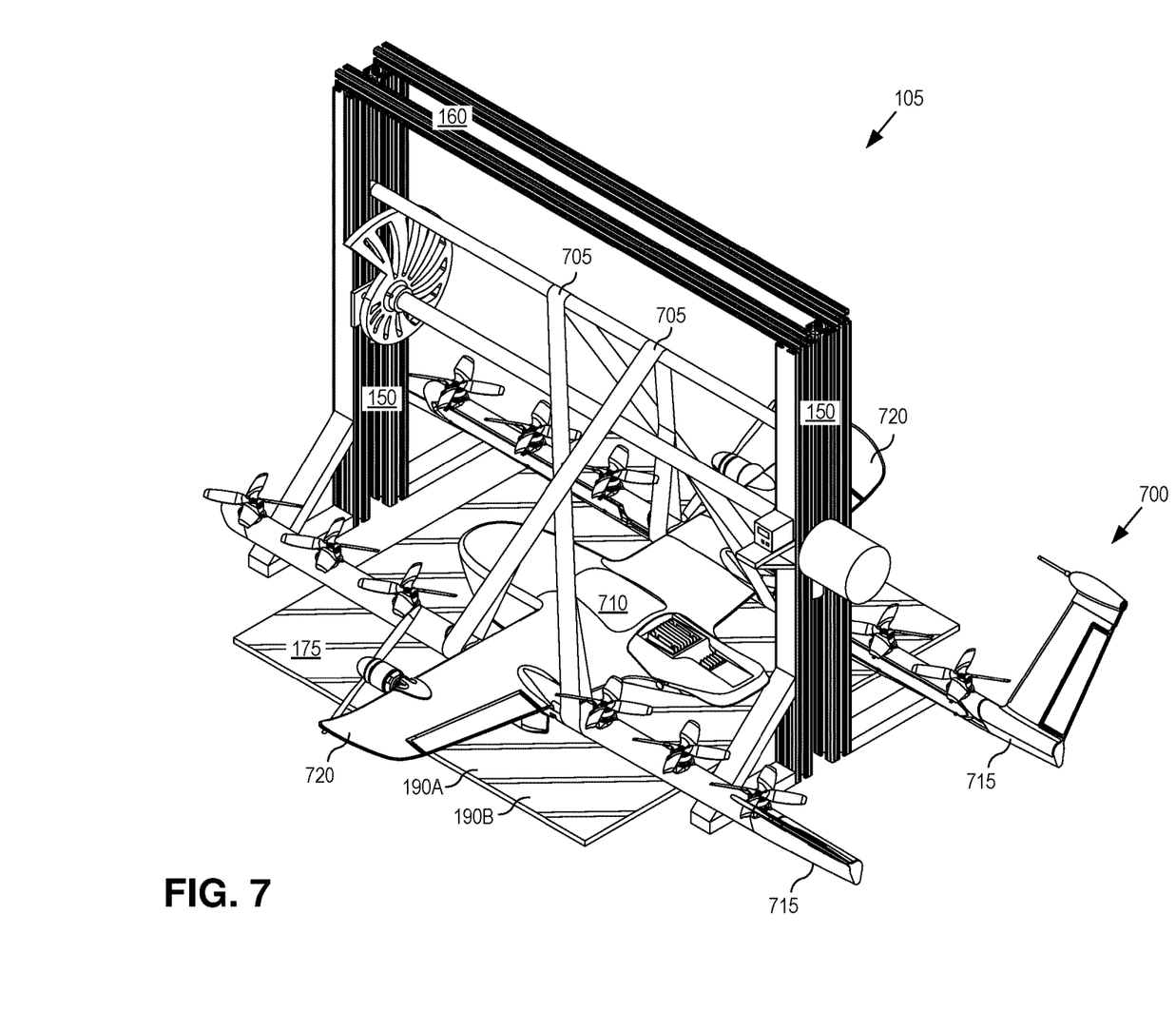
FIG. 7 is a perspective view illustration of a UAV tethered into the drop test system using a lifting harness attached to opposing sides of a fuselage of the UAV, in accordance with an embodiment of the disclosure.

FIG. 7 is a perspective view illustration of a UAV 700 tethered into frame assembly 105 using a lifting harness 705, in accordance with an embodiment of the disclosure. In the illustrated embodiment, lifting harness 705 includes two separate straps of equal length to provide level, balanced lifting of UAV 700 from opposing sides of fuselage 710 of UAV 700. In particular, the straps wrap around rotor booms 715 fore and aft of wings 720. Of course, other tethering configurations may be implemented, and the UAV 700 may even be tethered in unlevel orientations to drop test off balance landings. Although FIG. 7 illustrates lifting harness 705 as a pair of straps, other form factors may be implemented.

FIG. 7 further illustrates how a landing pad 175 may be positioned under UAV 700 during shock testing. Landing pad 175 not only serves as a landing pad but also operates as a charging pad with alternating strips of charging electrodes 190A and 190B (collectively referred to as charging electrodes 190). Charging electrodes 190 are adapted to form electrical contact with charging pins 805 disposed on the underside 810 of fuselage 710 (see FIG. 8). Drop test assembly 100 may be operated to test the reliability of this electrical contact over a sequence of drop tests. In one embodiment, controller 135 may be wired to monitor and record whether electrical contact is achieved with each drop test and provide feedback regarding how often charging pins 805 and/or landing pad 175 should be serviced in the field. For example, charging pins 805 may be implemented with spring loaded pogo pins having sharp tips intended to pierce contamination films that may build up on landing pad 175 over time. The drop test assembly 100 may be used to determine the life expectancy of the pogo pins and/or maintenance intervals for spring replacement, tip replacement, and/or landing pad 175 replacement.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A drop test system, comprising:
   support members offset from each other and having corresponding tracks;
   a horizontal lifting rod bridging the support members and having rod ends adapted to engage with the tracks to move along the tracks; and
   a pair of spiral cams adapted to rotate in unison and positioned to engage with and reciprocally lift and drop the horizontal lifting rod as the spiral cams rotate, wherein the spiral cams each have a perimeter shape that includes an abrupt section and a curved section that connects to opposing ends of the abrupt section, wherein the curved section includes a smooth curvature,
   wherein the horizontal lifting rod that bridges between the support members rests directly on the perimeter shape of both the spiral cams and is adapted to gradually lift and drop a unit under test (UUT) as the spiral cams rotate.

2. The drop test system of claim 1, further comprising:
a camshaft extending between the support members, wherein the spiral cams are attached to the camshaft to rotate with the camshaft and angularly aligned on the camshaft to lift and drop the horizontal lifting rod in unison.

3. The drop test system of claim 2, further comprising:
a motor mounted to one of the support members and coupled to the camshaft to rotate the camshaft; and
a counter engaged with one of the spiral cams, the camshaft, or the motor to count sequential drops of the UUT.

4. The drop test system of claim 2, wherein each of the spiral cams includes a protruding hub adapted to slide onto the camshaft and enable reconfigurable swapping of the spiral cams with different spiral cams.

5. The drop test system of claim 1, wherein the tracks each comprise a sliding track and the rod ends each comprise a sliding carriage that slides along the sliding track, wherein the sliding carriage is elongated along a dimension parallel to the sliding track.

6. The drop test system of claim 5, wherein the support members comprise vertical support members and the abrupt section is shaped to cause a freefall gravity drop of the horizontal lifting rod when the abrupt section on the spiral cams rotationally sweeps past the horizontal lifting rod.

7. The drop test system of claim 1, wherein an outer end of the abrupt section of the perimeter shape cantilevers over an inner end of the abrupt section to facilitate a freefall gravity drop of the horizontal lifting rod when the abrupt section rotationally sweeps past the horizontal lifting rod.

8. The drop test system of claim 1, wherein the curved section of the perimeter shape comprises a flat portion smoothly blending into a golden spiral curve having a logarithmic spiral growth factor.

9. The drop test system of claim 1, wherein the UUT comprises an unmanned aerial vehicle (UAV) having a fuselage, the drop test system further comprising:
a lifting harness attached to the horizontal lifting rod and adapted to lift the UAV from two opposing sides of the fuselage.

10. The drop test system of claim 1, wherein the UUT comprises an unmanned aerial vehicle (UAV) having charging pins disposed on an underside of the UAV, the drop test system further comprising:
a landing pad disposed beneath the horizontal lifting rod between the support members, wherein the landing pad includes a plurality of charging electrodes adapted to form electrical contact with the charging pins when the UAV lands on the landing pad; and
a controller communicatively coupled to at least one of the landing pad or the UAV to track instances of forming electrical contact between the charging pins and the charging electrodes during a sequence of drop tests of the UAV on the landing pad.

11. The drop test system of claim 1, wherein the UUT comprises an unmanned aerial vehicle (UAV), the drop test system further comprising at least one of:
a fan positioned relative to the support members to blow on the UUT and simulate cross winds; or
a moisture dispenser positioned relative to the support members to dispense moisture on the UUT and simulate rain.

12. A drop test assembly, comprising:
vertical support members offset from each other and having corresponding vertical tracks;
a horizontal lifting rod bridging the support members and having rod ends adapted to engage with the tracks to move along the tracks;
a camshaft extending between the vertical support members; and
a pair of spiral cams attached to the camshaft to rotate with the camshaft and positioned to engage with and reciprocally lift the horizontal lifting rod as the camshaft rotates, wherein the spiral cams each have a perimeter shape that includes an abrupt section and a curved section that connects to opposing ends of the abrupt section, and wherein the curved section includes a smooth curvature,
wherein the horizontal lifting rod that bridges between the vertical support members rests and rides directly on the perimeter shape of both the spiral cams to reciprocally lift and drop a unit under test (UUT) as the camshaft rotates.

13. The drop test assembly of claim 1, further comprising:
a motor mounted to one of the vertical support members and coupled to the camshaft to rotate the camshaft; and
a counter engaged with one of the spiral cams, the camshaft, or the motor to count sequential drops of the UUT.

14. The drop test assembly of claim 12, wherein the tracks each comprise a sliding track and the rod ends each comprise a sliding carriage that slides along the sliding track.

15. The drop test assembly of claim 12, wherein the spiral cams are removeable from the camshaft.

16. The drop test assembly of claim 12, wherein the abrupt section has a length that defines a drop height of the horizontal lifting rod.

17. The drop test assembly of claim 12, wherein the abrupt section is shaped to cause a freefall gravity drop of the horizontal lifting rod when the abrupt section rotationally sweeps past the horizontal lifting rod.

18. The drop test assembly of claim 17, wherein an outer end of the abrupt section of the perimeter shape cantilevers over an inner end of the abrupt section.

19. The drop test assembly of claim 12, wherein the curved section of the perimeter shape comprises a flat portion smoothly blending into a golden spiral curve having a logarithmic spiral growth factor.

20. The drop test assembly of claim 12, wherein the UUT comprises an unmanned aerial vehicle (UAV) having charging pins disposed on an underside of the UAV, the drop test assembly further comprising:
a landing pad disposed beneath the horizontal lifting rod between the vertical support members, wherein the landing pad includes a plurality of charging electrodes adapted to form electrical contact with the charging pins when the UAV lands on the landing pad; and
a controller communicatively coupled to at least one of the landing pad or the UAV to track instances of forming electrical contact between the charging pins and the charging electrodes during a sequence of drop tests of the UAV on the landing pad.

21. The drop test system of claim 1, wherein the support members comprise vertical support members and wherein the tracks are grooves recessed into the vertical support members.

22. The drop test system of claim 21, wherein distal ends of the horizontal lifting rod slide within the grooves.

23. The drop test system of claim 1, wherein the horizontal lifting rod comprises a cylindrical rod extending between the support members and a circular cross-sectional shape of the cylindrical rod rides directly on the perimeter shape of both of the spiral cams.

\* \* \* \* \*